(12) United States Patent
Hofmann

(10) Patent No.: US 7,141,167 B2
(45) Date of Patent: Nov. 28, 2006

(54) FILTER DEVICE

(75) Inventor: Wilfried Hofmann, München (DE)

(73) Assignee: N F T Nanofiltertechnik GmbH, Munich (DE)

( * ) Notice: Subject to any disclaimer, the term of this patent is extended or adjusted under 35 U.S.C. 154(b) by 344 days.

(21) Appl. No.: 10/475,413

(22) PCT Filed: Apr. 23, 2002

(86) PCT No.: PCT/EP02/04435

§ 371 (c)(1),
(2), (4) Date: Mar. 1, 2004

(87) PCT Pub. No.: WO02/085493

PCT Pub. Date: Oct. 31, 2002

(65) Prior Publication Data

US 2004/0149635 A1    Aug. 5, 2004

(30) Foreign Application Priority Data

Apr. 23, 2001  (DE)  ................. 101 19 919
Apr. 22, 2002  (DE)  ................. 102 17 966

(51) Int. Cl.
*B01D 63/00*  (2006.01)
*B01D 35/22*  (2006.01)

(52) U.S. Cl. .............. 210/321.69; 210/194; 210/195.3; 210/195.4; 210/196; 210/197; 210/258; 210/299; 210/304; 210/308; 210/310; 210/312; 210/311; 210/407; 210/456; 422/101

(58) Field of Classification Search ................ 422/101; 210/194, 195.3, 195.4, 196, 197, 258, 299, 210/304, 308, 310, 311, 312, 321.69, 407, 210/456
See application file for complete search history.

(56) References Cited

U.S. PATENT DOCUMENTS

| 3,501,012 A | 3/1970 | Ryan |
|---|---|---|
| 4,533,471 A | 8/1985 | Collins, Jr. |
| 4,867,885 A * | 9/1989 | Yen ............................. 210/636 |
| 5,494,574 A * | 2/1996 | Unterman et al. .......... 210/150 |
| 5,944,998 A * | 8/1999 | Rolchigo et al. ........... 210/645 |
| 2003/0121858 A1* | 7/2003 | Yu et al. ...................... 210/654 |
| 2005/0006296 A1* | 1/2005 | Sullivan et al. .......... 210/321.6 |

FOREIGN PATENT DOCUMENTS

| DE | 1 436 287 | 2/1969 |
|---|---|---|
| DE | 75 25 662 | 7/1972 |
| DE | 35 20 489 C1 | 5/1986 |
| DE | 38 18 437 A1 | 12/1989 |
| DE | 39 24 658 A1 | 1/1991 |

(Continued)

*Primary Examiner*—Krishnan S Menon
(74) *Attorney, Agent, or Firm*—Senniger Powers

(57) ABSTRACT

A filter device for filtering liquids including a filter membrane, a main body which is arranged upstream from the filter membrane, and which has a feed channel perpendicular to the surface of the filter membrane, a gap extending between the filter membrane and the main body forming a tangentially directed cross-flow, and a return channel which is used to return the tangential flow to the feed channel. The flow is primarily returned thereto by means of a contraction in the feed channel at the mouth of the return channel. Preferably, a solid separator is disposed in the return channel. At least one baffle element is arranged in the feed channel in order to create a turbulent flow. The tangential flow along the filter membrane is used to clean said membrane.

19 Claims, 3 Drawing Sheets

FOREIGN PATENT DOCUMENTS

| | | |
|---|---|---|
| DE | 43 29 587 C1 | 9/1994 |
| EP | 0 341 573 A1 | 11/1989 |
| GB | 2 088 235 A | 6/1982 |
| JP | 04222622 A * | 8/1992 |
| WO | WO 97/32652 A1 | 9/1997 |
| WO | WO 00/69547 A1 | 11/2000 |

* cited by examiner

FILTER DEVICE

BACKGROUND OF THE INVENTION

The invention pertains to a filter device for filtering fluids.

A filter device used for tangential or crossflow filtration processes, in which a predominantly tangential flow is produced along a filter membrane, is shown in DE 72 25 662 U1.

Another filter device having at least one filter surface for filtration of fluids containing solids is known from DE 39 24 658 A1 ('658). In order to prevent the formation of filter cakes and the clogging of the filter pores, the '658 publication proposes to set the filter surface in motion. Alternatively or additionally, a flow can be produced in the fluid to be filtered, wherein the velocity component of said flow that is directed tangentially relative to the filter surface is no lower than 0.1 m/sec. A turbulent flow is preferably produced in this case in order to keep the filter surface clean, for example, by means of a passing flow consisting of a gas/fluid mixture. However, the desired turbulence for counteracting the formation of filter cakes can also be produced with pumps, nozzles, agitating units, baffles, guide plates, rotating rollers or vibration devices. In addition, it would also be conceivable to electrically charge the filter surface such that it repels solids.

The known filter device comprises several dirty water chambers and a corresponding number of pure water chambers that are separated from one another by a membrane. The main flow direction in the dirty water chambers extends tangentially to the membrane. The fluid to be filtered is also supplied parallel to the membrane. Another important aspect is that the filtration takes place in a largely unpressurized fashion. An enrichment of the solids contained in the fluid occurs in front of the filter surfaces in the dirty water chambers, and the solids are then removed from the filter surfaces by means of lines and pumps. Depending on the turbidity of the fluid, this should take place in the dirty water chambers. A measuring head and a control unit for controlling the corresponding pump are also provided in this case.

Blocking or "fouling" of the filter membranes occurs in membrane filtration methods. The fouling causes the rate of flow through the filter membrane or the filter medium per unit time (dV/dt) to decrease. Various subprocesses contribute individually or collectively to this fouling. First, the pores of the membrane are partially blocked such that a relatively rapid decrease in the rate of flow results; second, a so-called "filter cake" (frequently also referred to as a "secondary membrane") is formed on the upstream side of the filter medium. This filter cake additionally increases the flow resistance such that the rate of flow through the filter medium is additionally reduced, but it increases the resistance more slowly than does blocking of the pores. A so-called concentration polarization layer may also form on the filter cake.

The various processes that cause fouling can be categorized into reversible and irreversible processes that can either be reversed with certain measures, e.g., backflushing, or not reversed (e.g., adsorption).

In addition, the retained materials not only form a filter cake on the upstream side of the filter (inflow side), but penetrate at least partially into the filter medium and block the channel or pore structures therein. In such instances, cleaning of the filter medium by means of conventional cleaning methods can, if at all, be achieved only with great difficulty.

These mechanisms reduce the maximum operating time (service life) of the filter media and consequently increase the costs and expenditure of labor (maintenance, monitoring, etc.) for the filtration process.

Numerous proposals, methods, and devices for removing a filter cake are known from the prior art. Physical and chemical methods are utilized for removing the retained materials and for cleaning the filter.

The physical cleaning methods include, for example, the use of raking or shaking devices. In methods of this type, the filter cake is removed from the upstream side of the filter medium by a rake or a similar device. Sometimes the filter is set into vibration or a turbulent flow is produced.

For example, baffles and/or frequency generators (such as ultrasound generators) are used to produce turbulent flows. In a few embodiments known from the prior art, a flow that is directed parallel to the filter surface (crossflow) is produced in order to carry off filter cake particles, with the aid of a suitably introduced gas, for example. However, such mechanisms require large filter surfaces for achieving a sufficient flow through the filter medium.

So-called "backwashing" of the filter also falls into this category of cleaning methods. In this method, the filtration process is interrupted, the filter medium is flushed with a cleaning fluid in the direction opposite to the original flow, and the filtration process is subsequently continued (with a certain "lead time").

In chemical methods, the filter medium is, for example, flushed with one or more cleaning solutions. These cleaning solutions may remain in the filter medium after the cleaning process and, if so required, need to be flushed out (for example, by continuing the filtration process and discarding rather than using fluid filtered immediately after the filtration process is restarted).

Known methods for removing a filter cake (e.g., DE 39 24 658 A1) have certain disadvantages. They require a substantial technical expenditure (raking or agitating units, gas supply, vibration devices, etc.), and the methods become more complicated and susceptible to defects. In addition, the maintenance effort and costs are comparatively high.

Conventional cleaning methods are not always entirely effective, i.e., they do not completely clean the filter membrane or its inflow side.

Another disadvantage can be seen in the fact that certain devices known from the prior art require large systems, filter surfaces, etc., in order to achieve a sufficient filtrate throughput.

Another disadvantage of these cleaning methods is that filtration needs to be interrupted in order to carry out the cleaning process, which reduces filter throughput and increases costs.

Another disadvantage can be seen in the energy requirement of these conventional methods and the associated costs.

According to DE 38 18 437 A1, which also forms part of the pertinent prior art, a filter battery with baffle elements is used in order to produce turbulences. The battery is alternately operated in the filtration mode and in the flushing mode.

DE 43 29 587 C1 discloses a self-cleaning device for filtering a fluid, wherein the filter is integrated into the wall of a pipe and the fluid to be filtered is supplied to the pipe. The fluid to be filtered partially passes through the filter and emerges in the form of filtrate, and the remainder of the fluid to be filtered, which still contains solids, emerges from the outwardly opening end of the pipe.

WO 97/32652 discloses a filter in which the medium to be filtered is also subjected to intense turbulence that is, for example, produced with a rotor, sound waves, electric fields and the like.

DE 35 20 489 C1 discloses a filter with a tangential inlet, wherein the fluid is introduced into the interior of a receptacle with a controlled turbulence and an agitator arranged above the filter membrane produces a continuously changing field of alternating pressure in order to prevent the membrane from becoming covered with particles.

DE 14 36 287 A1 also discloses a tangential filter, in which the filter wall is flushed in order to loosen deposits.

SUMMARY OF THE INVENTION

The invention is based on the objective of improving known filter devices in such a way that the formation of a cover layer (filter cake) of materials retained by the filter membrane is, if not entirely prevented, at least significantly slowed on the upstream side of the filter membrane (inflow side).

The objective should essentially be achieved by automatically cleaning the inflow side of the filter membrane. It should, in particular, be possible to clean the filter membrane in a largely continuous fashion without external interventions by the personnel, with the fewest possible interruptions of the filtration process, and without auxiliary media (e.g., introduced gases). Replacement of the filter arrangement or of one of its components preferably should also be simplified, and the maintenance effort should be reduced. In addition, the service life of the filter membrane should be extended while simultaneously reducing costs.

The basic principle of the invention consists of producing a circulation, i.e., a crossflow for cleaning the filter membrane and a return flow, wherein the main filtering direction lies perpendicular to the membrane. This makes it possible to continuously remove and dispose of the retained materials without having to interrupt the filtration process. In contrast to the initially cited DE 72 25 662 U1, the invention proposes to predominantly carry out a so-called "dead-end filtration," wherein the main flow is directed perpendicularly through the filter membrane and the crossflow component impressed on the fluid primarily serves to remove retained materials on the inflow side of the filter membrane. The fluid of the crossflow component that transports the retained materials is conveyed to a return channel via extraction points and conveyed back into the supply channel via this return channel. A solids separator for additionally depleting the solids content of the fluid preferably is arranged in the region of the return channel.

The driving force for the filtration process is generated by a device that produces the main flow in the supply channel, e.g., a main pump.

The tangentially directed crossflow is achieved due to the geometry of the filter membrane and the main body assigned thereto. The return flow in the return channel, which has a substantial component in the opposite direction of the main flow in the supply channel, is preferably realized by means of a flow restriction that causes local pressure differentials at the point at which the return channel feeds the fluid back into the supply channel. Due to the relatively short distances and the low pressure drop along these distances, only a relatively slight pressure differential is required for the return flow of the fluid. The correlation between pressure and flow velocity and between channel cross section and flow velocity is described in accordance with Bernoulli's equation $$P_{ges} = p + \frac{1}{2}\rho v^2 = \text{konst.}$$

(with p=pressure; ρ=density and v=velocity) and with the continuity equation $$A_1 V_1 = A_2 V_2$$

(A=cross-sectional surface perpendicular to the flow velocity).

According to these two equations, the velocity increases and the pressure drops as the cross section decreases. If a flow restriction is arranged in the supply channel at the location at which the return channel feeds the fluid back into the supply channel, it is possible to generate a pressure differential between this location and the surface of the filter membrane. This pressure differential causes or at least promotes the return flow of the fluid.

Alternatively or additionally, a pump can be arranged in the return channel.

The end of the return channel is preferably realized in the form of a pipe that protrudes into the supply channel and is bent in the direction of the filter membrane. The cross section of the supply channel is narrowed in the vicinity of the pipe end, by means of a reduced cross section or by "baffle elements" inserted into this region. Such a baffle element consists, for example, of an axially symmetrical insert that has the function of locally producing a pressure differential directly after the pipe end in order to feed the returned fluid into the supply channel. In this case, the faster flow velocity of the fluid caused by the restriction generates a suction effect.

In conventional tangential or crossflow filtration processes, the throughput per unit surface area of the filter and unit time is very low. This means that very large filter surfaces are required in order to achieve a higher, and consequently more economical throughput. The separation effect of the filter is predominantly realized in the form of a diffusion through the filter.

The device according to the invention is very compact and requires relatively small filter surfaces. The filter device according to the invention also has a high throughput, namely because it is not utilized in a so-called crossflow method, but rather in a so-called dead-end method (the fluid flows against the membrane parallel to a line normal to the membrane). Higher pressures are also utilized in the dead-end method, such that a compact design and high throughput of the filter device can be achieved. The equipment expenditure for the filter according to the invention is low because no moving parts are required. This significantly reduces the costs, the susceptibility to defects, the energy consumption and the expenditure of labor (maintenance, operation).

The baffle elements used in one preferred embodiment of the invention serve primarily to produce the required crossflow over the entire membrane surface, such that essentially all membrane regions are reliably cleaned. The turbulence is predominantly produced by a combination of velocity and small gap dimensions, wherein the baffle elements function just to add to the turbulence. This geometry also makes it possible to operate with high pressures and consequently a high throughput. The invention allows very high crossflow velocities that can be realized without auxiliary means, e.g., pumps, nozzles, agitators etc., and consequently without additional energy consumption. These high crossflow velocities ensure an excellent transport effect, as well as production of the required turbulence. The design according to the invention with replaceable baffle elements can also be easily adapted to different process requirements.

The desired cleaning effects are additionally intensified if electric fields are incorporated into the cleaning process.

The filter arrangement according to the invention not only serves to clean the filter membrane and to dispose of the separated materials, but also protects the membrane from pressure surges to a certain degree.

DETAILED DESCRIPTION OF THE PREFERRED EMBODIMENT

Figure 1:
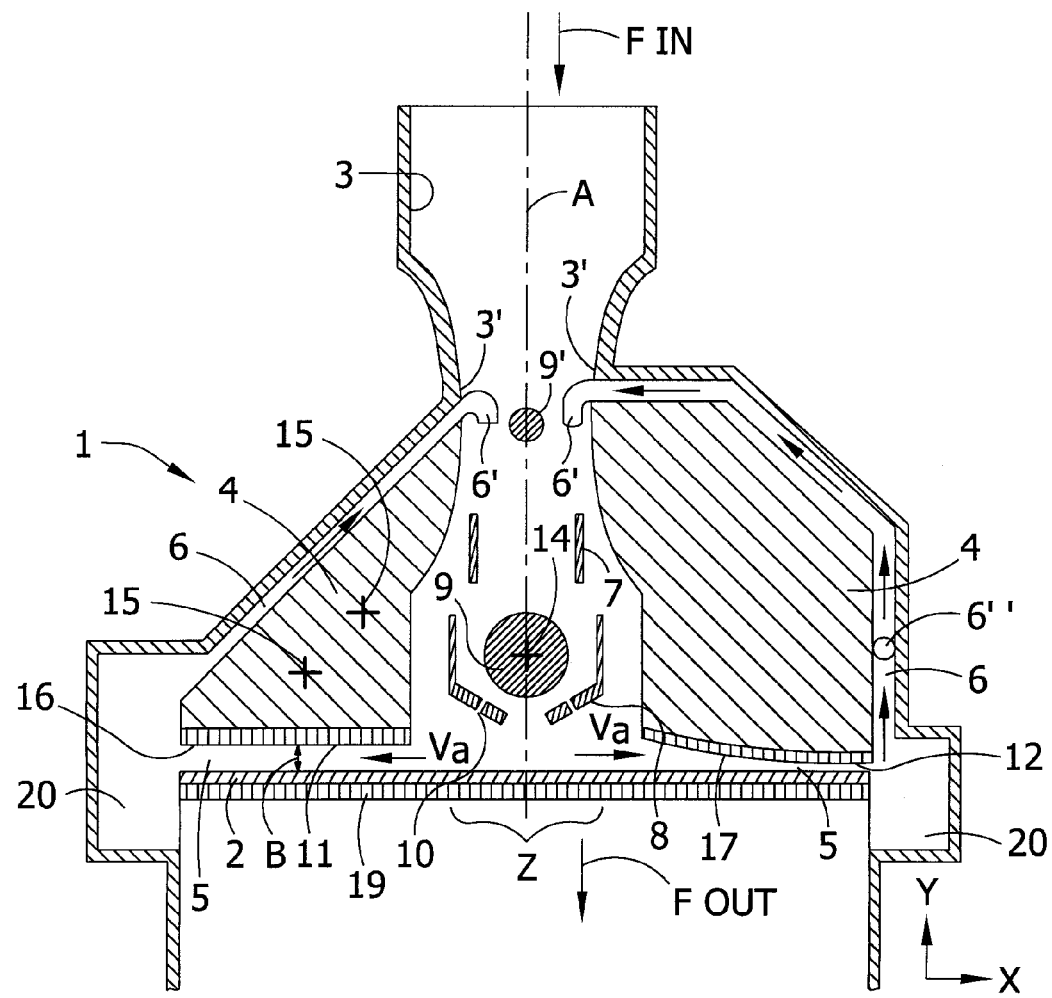
FIG. 1 shows two embodiments of a filter device according to the invention respectively illustrated in the left half and in the right half of FIG. 1.

FIG. 1 shows some variations of filter devices according to the invention. A fluid to be filtered is supplied to a filter membrane 2 of the filter device 1 via a supply channel 3 that extends perpendicular to the surface of the filter membrane 2. The fluid normally consists of a fluid that is contaminated with solids. However, it may also consist of a gas that is contaminated with solids. A main body 4 is arranged in front of the filter membrane 2 viewed in the flow direction (see arrow $F_{in}$). This main body continues and consequently forms part of the supply channel 3, and has a contour that extends laterally beyond the supply channel 3 essentially parallel to the filter membrane 2. This contour lies a short distance B from the filter membrane and forms a gap 5. In the left portion of FIG. 1, this gap has a constant width B. In the variation illustrated in the right portion of FIG. 1, the gap becomes smaller from the center, i.e., the supply channel 3, toward the outside, such that a nozzle effect is produced.

The fluid is transported to the filter membrane 2 with a velocity component that extends perpendicular to the surface of the filter membrane in the cross-sectional region of the supply channel 3. A substantial portion of the flow is then conveyed parallel to the surface of the filter membrane 2 through the gap 5 that serves as the cross channel, namely as indicated by the arrows $V_q$ (for crossflow velocity). The cross channel 5 then transitions into a return channel 6 that conveys the fluid emerging from the gap 5 back into the supply channel 3. The end of the return channel 6 that leads into the supply channel 3 is realized in the form of a pipe end 6' that is bent in the direction of the filter membrane 2 such that the returned fluid is fed back into the supply channel parallel to the main flow (see arrow $F_{in}$). In the embodiment according to FIG. 1, the supply channel 3 contains a restriction 3' (flow restrictor) wherein the narrowest point preferably lies in the vicinity of the outlet of the pipe ends 6' of the return channel 6. As described above, this restriction results in a higher flow velocity and consequently a pressure drop in this region, such that the pressure on the outlet end of the return channel is lower than at the surface at the filter membrane and at the inlet of the return channel 6. The described effect is additionally promoted by the cross-sectional restriction caused by the pipe ends 6' that protrude into the supply channel 3.

Inserts that also serve to reduce the flow cross section may be arranged in the vicinity of the outlet opening of the return channel 6 alternatively or additionally to the cross-sectional restriction 3', said inserts having the shape of, for example, spherical elements 9'.

A pump 6'' may be alternatively or additionally arranged in the return channel 6 in order to realize the return flow of the fluid.

Several tubular, axially symmetrical baffle elements 7 and 8, as well as a spherical baffle element 9, are arranged in the supply channel 3. The entire device 1 including the main body, the baffle elements, etc., is realized as axially symmetrical relative to the axis A. In the embodiment shown in FIG. 1, the baffle element 7 has a purely cylindrical shape and the baffle element 8 has the approximate shape of a funnel with perforations 10 that ensure a more intense turbulence. These perforations may also be arranged to axially symmetrical relative to the axis A.

Relative to a Cartesian coordinate system with the two axes x and y that is illustrated in the lower right corner of FIG. 1, the fluid flows along the baffle elements 7, 9 in the direction of the arrow $F_{in}$, namely in the direction of the negative y-axis parallel to the axis of symmetry A. The fluid then flows in the direction of the inflow side of the filter membrane 2 through the perforated baffle element 8. This causes a turbulent flow to be produced on the inflow side of the membrane 2, wherein this turbulent flow is produced particularly, but not exclusively in the center of the membrane inflow side. This turbulent flow at least decelerates the depositing of materials retained by the membrane 2 on the inflow side. In addition, a flow with a high crossflow velocity ($V_q$) is produced parallel to the membrane 2 in the gap 5, wherein this flow transports the retained materials along the inflow side of the membrane (parallel to the x-direction). The crossflow in the gap 5 is preferably turbulent such that materials situated on the membrane 2 are "swirled up" and transported away with the crossflow.

The retained materials are removed or separated from the crossflow, and the crossflow that is subsequently essentially free of retained materials is conveyed back into the main flow, i.e., the supply channel 3, via the return channel 6. This makes it possible to clean the membrane 2 without interrupting the filtration process.

Different variations of the return channel design are illustrated in the right and the left half of FIG. 1. In the left portion, the return channel extends obliquely upward in a straight fashion. In the right portion, the return channel initially extends vertically upward and then back into the return channel 3 in the form of an angled-off section, a horizontal section and a downwardly bent section. Naturally, the return channel can also have a different shape.

If the distance from the center of the membrane 2 to its edge is not excessively long, the pressure drop along this distance is relatively small, and a sufficient obliquely upward in a straight fashion. In the right portion, the return channel initially extends vertically upward and then back into the return channel 3 in the form of an angled-off section, a horizontal section and a downwardly bent section. Naturally, the return channel can also have a different shape.

If the distance from the center of the membrane 2 to its edge is not excessively long, the pressure drop along this distance is relatively small, and a sufficient transport effect is provided, as is described in approximation by the Law of Hagen-Poiseuille $$\Delta p = \frac{dV}{dt} \cdot R = \frac{8\eta L}{\pi r^4} \frac{dV}{dt}$$

where L=length of a pipe and r=radius of the pipe, which approximately corresponds to B.

The flow state of a fluid is described with the aid of the Reynolds number Re that is defined by the following equation (1):

$$Re = 2r\rho v/\eta \quad (1)$$

In this case, r (m) is the radius of the cross-sectional area through which the fluid flows, ρ is the density of the fluid (which depends on the fluid temperature), v (m/s) is the flow velocity and η(Pa·s) is the viscosity of the fluid. For example, the corresponding values for water are: $\eta=1.8\times10^{-3}$ Pa·s (at 0° C.) and $1.0\times10^{-3}$ Pa·s at 20° C.; $\rho=1000$ kg/m³. The flow is laminar for Re values<approximately 2000 and turbulent for Re values>

The example of the filter device illustrated in FIG. 1 has, for example, the following parameter values (in SI units): $\rho=1000$ kg/m³, $\eta=1.8\times10^{-3}$ Pa·s, $r=0.5\times10^{-3}$ m (0.5 mm)=B/2; v=10 m/s (pressure differential 1 bar). These values result in a Re value≈5500 for the gap region 5 between the underside 12, 16 and the membrane 2, i.e., a turbulent flow with a very high flow velocity v.

If the parameters are varied (particularly r and B) over the fluid path, it is possible to produce zones with a turbulent flow and zones with a laminar flow, and the pressure drop along the upstream side of the membrane 2 can be adjusted accordingly. Naturally, this also applies to any other region of the fluid flow, in particular, the region of the baffle elements 7, 8 and 9. A turbulent flow with an intense crossflow component is produced in the region z of the surface of the membrane 2 due to suitable parameters and shape of the baffle elements.

A second embodiment of the filter device according to the present invention is shown in the right portion of FIG. 1. This embodiment is realized in similar fashion to that shown in the left portion of FIG. 1. However, the underside 12 of the main body 4 does not extend parallel to the membrane 2 as is the case with the underside 16 in the left portion of FIG. 1, but rather forms a gap 5 that narrows in the direction of the edge of the membrane 2. The contour can, in particular, be defined in accordance with the Hagen-Poiseuille equation such that the respective ratios dV/dt×L/r⁴ and dV/dt×L/B⁴ have a constant value. According to the Hagen-Poiseuille equation, this leads to a constant pressure drop (Δp) over the length L on the inflow side of the membrane 2. Depending on the chosen parameters (e.g., dV/dt, L, r or B, and η), the pressure drop required to transport away retained materials can be defined in the desired fashion. This improves the transport efficiency and makes it possible to reduce the pressure on the inflow side of the membrane 2 (reduced energy requirement, smaller pumps, and lower pump outputs). In this embodiment of the filter device 1, no additional expenditure of energy and no additional media (e.g., gases or the like) are required for cleaning the membrane 2 because the membrane is cleaned automatically.

According to one additional development of the invention, at least one electrode 14 can be additionally provided. In the example shown in the left portion of FIG. 1, a primary electrode 14 is arranged in the spherical baffle and two secondary electrodes 15 are arranged in the main body 4. Naturally, the number and arrangement of the electrodes may also be chosen differently. For example, it would possible to arrange electrodes 11, 17 on the main body 4, for example, directly on its respective undersides 16 and 12. The electrodes may also be arranged such that they fulfill the function of baffles in the gap 5. In this case, the electrodes should be encased in order to provide a protective shield against the fluid. The electrodes make it possible to generate electric fields in the fluid and, in particular, in the vicinity of the filter membrane 2, these electric fields preferably being pulsed such that the separation of retained materials from the membrane 2 is promoted. Another electrode 19 may be provided on the downstream or upstream side of the membrane 2, wherein this additional electrode naturally has a wider mesh than the membrane, and has a repellent effect on the solid particles.

The electrodes partially protrude into the fluid flow, in particular, into the gap 5, as well as in the direction of the membrane 2 from the spherical baffle element 9, wherein the electrodes are, for example, wired as an anode. Electrical conductors that are wired as a cathode are applied to the inflow side of the membrane. If a current pulse is transmitted through the fluid via the cathode and the anode, small gas bubbles are produced, e.g., due to the electrolytic breakdown of water, such that a layer of deposits which may have formed on the inflow side of the membrane is broken apart and its separation from the membrane is at least facilitated. This also causes extremely reactive free radicals to be produced which at least impair or even entirely prevent the formation of biofilms.

The values of the current pulses lie, for example, between a few 10 mA/cm² and a few 100 mA/cm². The number of current pulses per hour may lie between 2–12 or more, depending on possible fouling, the composition of the unfiltered fluid, and the membrane values. The duration of the current pulses lies between a few seconds (1–5 sec) and a few tens of seconds.

The number of electrodes assigned to the membrane surface (number of electrodes/membrane surface) naturally can be chosen in accordance with the respective requirements. In one embodiment, eight electrodes are provided in the main body and one electrode is provided in the spherical baffle element. The electrodes can also be protected from the fluid by means of a casing that does not influence the electric field. This additional feature can impair or entirely prevent the formation of a fouling layer, and makes it possible to significantly increase the throughput of the fluid through the membrane 2. Consequently, the same throughput can be achieved if the filter surface or the pressure (pump output, energy consumption) or the fluid velocity is reduced. The effects on the costs of the filtration process are quite apparent.

FIG. 1 also shows that a separating device 20 is arranged at the radial end of the gap 5 and in the region of the transition to the return channel 6. This separating device separates the materials being transported to the edge of the membrane such that they cannot be reintroduced into the return channel. This separating device 20 may simply consist of an annular container that may be realized as axially symmetrical relative to the axis A and receives the crossflow of the fluid. If the retained solid particles are heavier than the fluid, they precipitate and are "collected" in the separating device 20. The solid particles are intermittently removed from the separating device without having to interrupt the filtration process.

Figures 2A, 2B:
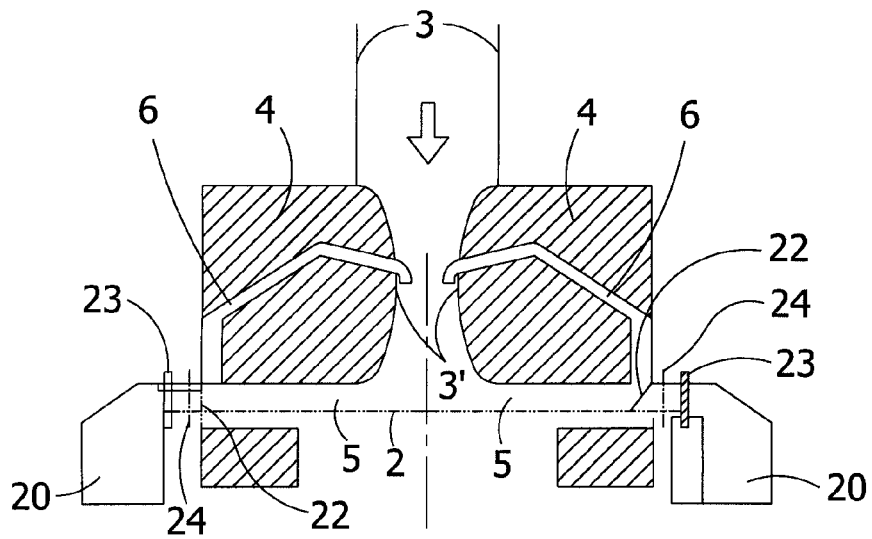
FIGS. 2a–2d show different variations of return flow and of solids transport.

FIG. 2A shows an embodiment of a separating device 20 that is mounted on the main body 4. This separating device consists of a collection container that is provided with a conventional inexpensive filter element 22 (e.g., of cellulose, metal or the like) on the side that is connected to the main body 4, said filter element preferably having a larger nominal pore diameter than the membrane 2. The separating device 20 is, for example, tightly connected to a projection or flange 24 of the main body 4 by means of a simple locking mechanism 23. A valve 24 that, for example, may consist of the simple rotary slide valve of conventional design can be provided between the locking mechanism 23 and the edge of the membrane 2. The valve 24 is briefly closed during the filtration process in order to allow the installation or replacement of the separating device 20 without having to interrupt the filtration process.

The function of the separating device 20 is described below. During the filtration process, the materials retained by the membrane 2 are transported to the membrane edge along the upstream side of the membrane 2, i.e., in the direction of the separating device 20. Due to the larger pore width of the conventional filter element 22, the retained materials can be transported into the collection container 20 through the filter element 22. The "dead zone effect" of the collection container 20 lowers the probability of the materials accumulating in the collection container being reintroduced into the fluid flow through the filter element 22. The entire space (collection container 20, gap 5 and return channel 6) is filled with fluid. Due to this measure, the separating device 20 effects a filtration wherein the separation of the retained materials is achieved by means of a suitable combination of flow progression (including the dead zone=collection container 20 and the return channel 6), crossflow and filtration with the membrane 2.

In order to promote the return of the fluid into the main flow $F_{in}$, the return channel 6 may, for example, be realized with a varying diameter, i.e., a diameter that is not constant. For example, the diameter of the return channel 6 may decrease from the valve 24 to the point at which the return flow is reintroduced into the main flow. This not only increases the flow velocity and decreases the pressure along the return channel, but also results in a certain pressure differential that "drives" the return flow in addition to the flow restriction 3' (or 9' in FIG. 1).

The fluid that is at least partially or largely free of the retained materials is fed back into the main flow $F_{in}$ via the return channel 6 formed in the main body 4 and conveyed back to the membrane 2 with this main flow, such that the cleaning circuit is closed. When observing one volume element in the fluid flow, materials are retained by the membrane 2 in a first passage through the cleaning circuit, transported to the separating device 20 with the aid of the crossflow, and deposited therein to a certain degree. Subsequently, the fluid that now has a significantly lower content of retained materials is reintroduced into the main flow. If the residual content of materials to be retained is still excessively high in the observed volume element, the filtration process at the membrane 2 is repeated. This results in a dynamic equilibrium, in which the membrane 2 simultaneously and continuously carries out the desired filtration process, the membrane 2 is automatically cleaned, and the retained materials are removed from the fluid flow.

The separating device 20 may be manufactured of stainless steel, plastic or any other customary materials used for such applications.

Figure 2C:
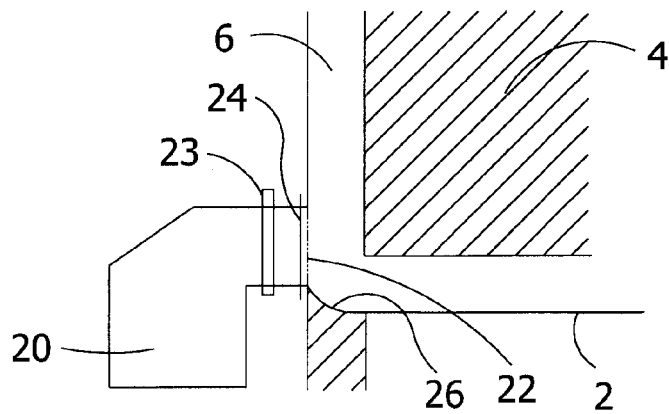

In other embodiments, the channels and/or the flow progression can be varied in accordance with the respective requirements. For example, the filter element 22 can be arranged at an angle other than 90° relative to the crossflow ($V_q$) emerging from the gap 5 (see FIG. 2B). It is also possible to arrange the inlet opening into the collection container 20 at its upper end such that materials introduced into the container settle out even better on its bottom, and are hardly, or preferably not at all, able to escape into the return channel 6. Other conceivable inflow geometries are schematically illustrated in FIG. 2C. The flow can be conveyed into the collection container 20 by means of an appropriate deflection 26 of the gap 5 toward the return channel 6.

Figure 2D:
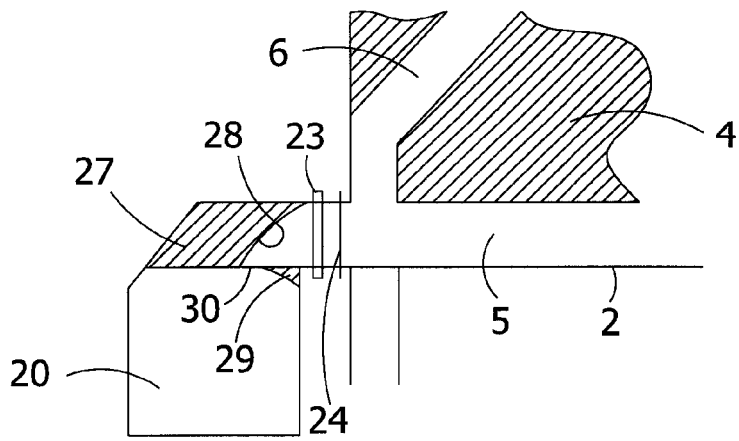

If the inflow opening into the collection container 20 is made comparatively small, it may, if so required, be possible to omit a filter element 22 entirely. The primary function of the filter element 22 consists of preventing or at least impairing return of the materials that were previously retained by the membrane 2, and were introduced into the collection container 20, from the collection container into the return flow and consequently into the return channel 6. The probability of particles being returned into the return flow and into the return channel 6 can also be reduced with constructive measures. One example of this is schematically illustrated in FIG. 2D, according to which appropriate guide elements 27, a concavely curved inflow edge 28 that is inclined toward the gap 5, and another guide plate 29 that forms a narrow gap 30 together with the inflow edge 28, are provided for this purpose. This geometry of the opening can be integrated into the separating device 20 such that standard elements can be used for the connections and piping of the separating device 20. The baffle elements 27 and 29 contained in the separating device 20 narrow the inlet channel into the collection container 20 from the connection 23 to a substantially smaller opening 30. The probability of materials introduced into the collection container 20 being returned through the opening 30 is approximately proportional to the ratio between the surface of the opening 30 and the surface of the entire inner wall of the collection container 20. It should be mentioned that the entire space (20, 5, 6) is filled with fluid once the device is "broken in," and that separation is based on an "enrichment or concentration" of the retained materials in the collection container 20. The invention utilizes the inertia of these materials during their transport into the separating device 20.

The mounting mechanisms of the collection container 20 may also be modified. It would be conceivable to utilize threaded and/or clamp-type connections if the tightness of the connection can be ensured.

It is preferred to utilize more than one separating device 20 in a filter device according to the present invention, namely at least two or more separating devices. If four separating devices are provided, they are symmetrically arranged on four sides. The utilization of more than one separating device also ensures that the separation process and consequently filtration at the membrane 2, as well as its cleaning, can continue during maintenance procedures (e.g., replacement, etc.).

The functional principle of the separating device described in this application represents an additional filtration that, if so required, can also be utilized in the form of an independent and/or sole filtration principal. If a suitable design is chosen (scaling, channel progression, etc.), the inertia of masses of materials that are contained by and should be removed from the fluid can be utilized for collecting these materials in "dead zones" in a circulating fluid flow. In this case, an increased flow resistance needs to be provided in the outflow channel for the depleted fluid at the location at which the circuit begins (e.g., by means of membranes, baffle elements, a varying channel diameter, etc.), and wherein the separating device may, if so required, also be realized in the form of a centrifugal filter.

Figures 3A, 3B:
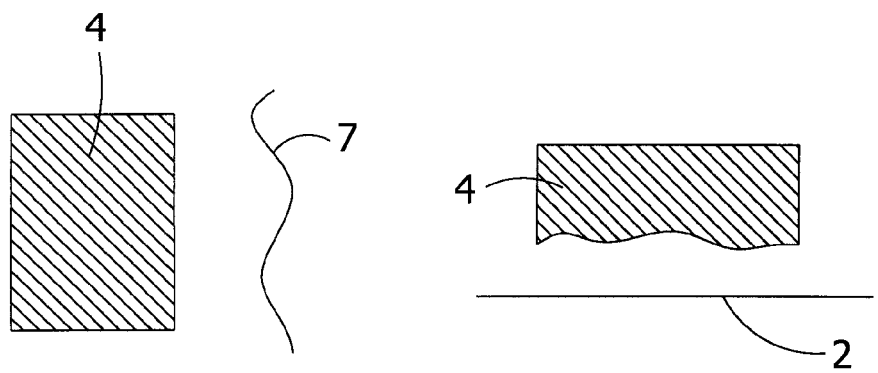
FIGS. 3a and 3b show a modification of a baffle element and a main body.

FIG. 3 shows that individual elements also have corrugated or non-planar surfaces. In FIG. 3A, the baffle element 7 is realized in a corrugated or ribbed fashion while the main body 4 has a smooth wall. Naturally, the main body 4 may also be corrugated. In FIG. 3B, the main body has a corrugated underside 12. This makes it possible to produce specific zones with a turbulent flow in regions that are spaced apart from the respective adjacent element by greater distances. The membrane 2 naturally may also be corrugated.

Figure 4:
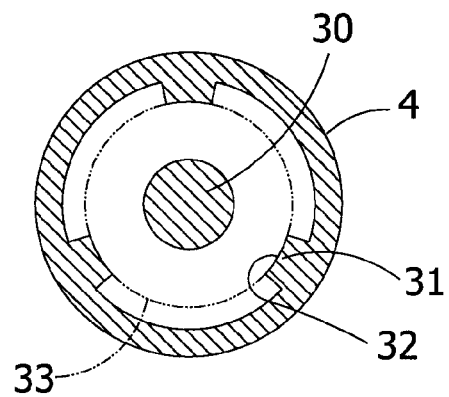
FIG. 4 shows installation of baffle elements into the filter device according to an embodiment of the invention.

FIG. 4 shows how a baffle element in the form of a shell is installed in the main body 4. The main body 4 comprises at least two sections 31 of an internal thread which protrude into the supply channel 3, with three sections being provided in the embodiment shown, wherein the radially inward directed surfaces 32 form the inside thread. An axially symmetrical baffle element 33 is provided with a corresponding external thread and is screwed into the internal thread 32. Other baffle elements, e.g., the baffle element 30, are also provided with corresponding threads. This shell-like structure can be arbitrarily expanded depending on the respective application.

Naturally, the baffle elements can also be installed with mounting devices other than threaded connections. For example, the two parts (main body and baffle element) may be respectively provided with pins and correspondingly designed grooves such that the part provided with the pins can be simply inserted into the grooves of the other part and interlocked therein. The two aforementioned mechanisms for installing the baffle elements provide a high degree of flexibility with respect to maintenance and parts to be replaced. Depending on the process conditions, the fluid used, etc., the baffle elements and naturally—if so required—also the main body can be exchanged with other components. The spherical baffle element 30 is interlocked, for example, with the baffle element 33 with the aid of projections.

Figure 5:
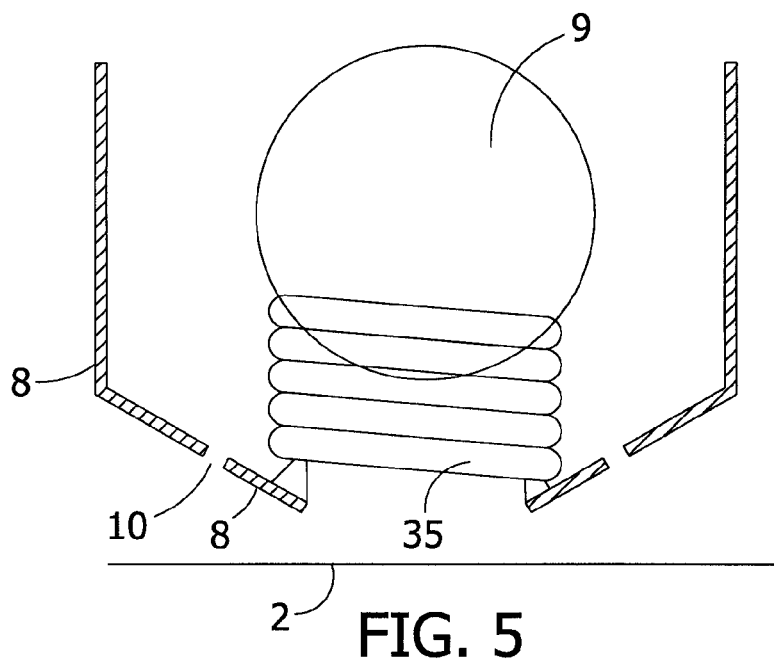
FIG. 5 shows an alternative embodiment of the installation of a baffle element into the filter device according to the invention.

In another embodiment of the invention that is illustrated in FIG. 5, the spherical baffle element 9 is supported on a spring 35 that is mounted on the baffle element 8. The spring constant of the spring 35 also makes it possible to realize a flow control. If a pressure surge occurs in the inflowing fluid, the spherical baffle element 9 is displaced in the direction of the membrane 2 against the force of the spring 35 such that the flow channel between the spherical baffle element 9 and the baffle element 8 becomes narrower. An essentially uniform fluid supply to the membrane 2 can be realized in this fashion. In addition, the membrane is protected from pressure surges that could damage the membrane and could also lead to an interruption of the filtration process.

The dimensions of the individual components of the above-described filter device can be chosen arbitrarily in order to adapt the filter device to the respective application. The principle of the invention certainly can also be utilized on an industrial scale, e.g., in wastewater treatment.

The filter device with the main body and the baffle elements can also be installed in a housing of stainless steel or other materials. This housing can be inserted into conventional pipelines by means of standard connections.

The invention claimed is:

1. A filter device for filtering a fluid comprising:
   a filter membrane having a surface,
   a main body disposed adjacent the upstream surface of the filter membrane,
   a supply channel extending through the main body perpendicular to the surface of the filter membrane,
   a gap between the main body and the filter membrane so as to produce a crossflow directed tangentially relative to the surface of the filter membrane,
   a return channel, for return flow of the fluid to be filtered, fluidly connected from the gap to the supply channel, and
   a flow restriction disposed upstream of the filter membrane, the flow restriction having at least one tube end protruding into the supply channel forming an outlet disposed to introduce the return flow into the supply channel parallel to the longitudinal axis of the supply channel, for causing the return flow of the fluid.

2. A filter device as set forth in claim 1 further comprising a pump disposed midway in the return channel.

3. A filter device as set forth in claim 1 further comprising a solids separator disposed in the return channel.

4. A filter device as set forth in claim 3 wherein the solids separator has an opening and an inner wall, the opening being significantly smaller than an area of the inner wall.

5. A filter device as set forth in claim 1 further comprising at least one baffle element disposed upstream of the filter membrane so as to produce a turbulent flow.

6. A filter device as set forth in claim 5 wherein said at least one baffle element contains at least one hole.

7. A filter device as set forth in claim 1 further comprising first and second baffle elements disposed upstream of the filter membrane so as to produce a turbulent flow wherein the first baffle element is inserted into and connected to the second baffle element.

8. A filter device as set forth in claim 7 wherein the baffle elements are threadably connected to one another.

9. A filter device as set forth in claim 7 wherein the baffle elements are connected to one another by pins.

10. A filter device as set forth in claim 5 wherein at least one of the first and second baffle elements contains an electrode.

11. A filter device as set forth in claim 10 wherein the electrode generates an alternating electric field.

12. A filter device as set forth in claim 5 wherein at least one baffle element is movable.

13. A filter device as set forth in claim 12 wherein the baffle element is moveably supported by a spring.

14. A filter device as set forth in claim 1 further comprising an electrode for generating an electric field in the fluid and disposed at least partially in the main body.

15. A filter device as set forth in claim 14 wherein the electrode generates an alternating electric field.

16. A filter device as set forth in claim 1 wherein the gap between the main body and the filter membrane has a width narrowing from the center to the periphery.

17. A filter device as set forth in claim 1 further comprising an additional filter element and a valve arrangement for shutting off the fluid supply to the solids separator, the valve being arranged between the gap and the solids separator.

18. A filter device as set forth in claim 17 wherein the additional filter element is arranged relative to the fluid flow at an angle other than 90.

19. A filter device as set forth in claim 1 wherein the return channel has a varying diameter narrowing in the return flow direction.

* * * * *